US005886679A

United States Patent [19]

Matsuda et al.

[11] Patent Number: 5,886,679

[45] Date of Patent: Mar. 23, 1999

[54] DRIVER CIRCUIT FOR DRIVING LIQUID-CRYSTAL DISPLAY

[75] Inventors: Kohei Matsuda; Sei Saitoh, both of Tokyo, Japan

[73] Assignee: NEC Corporation, Japan

[21] Appl. No.: 621,477

[22] Filed: Mar. 25, 1996

[30] Foreign Application Priority Data

Mar. 23, 1995 [JP] Japan .................................... 7-63863

[51] Int. Cl.[6] ............................ G09G 3/36; G02F 1/133

[52] U.S. Cl. ............................................................ 345/96

[58] Field of Search ................................ 349/33, 37, 34; 345/94, 209, 95, 96, 98, 100, 147, 103; 327/403

[56] References Cited

U.S. PATENT DOCUMENTS

| | | | |
|---|---|---|---|
| 5,526,014 | 6/1996 | Shiba et al. | 345/96 |
| 5,640,174 | 6/1997 | Kamei et al. | 345/96 |
| 5,646,643 | 7/1997 | Hirai et al. | 345/100 |
| 5,748,165 | 5/1998 | Kubota et la. | 345/96 |

FOREIGN PATENT DOCUMENTS

| | | | |
|---|---|---|---|
| 5552596 | 4/1989 | Japan | G11C 19/28 |
| 351887 | 3/1991 | Japan | G09G 3/36 |
| 4-149591 | 5/1992 | Japan | G09G 3/36 |
| 5119741 | 5/1993 | Japan | G09G 3/36 |
| 6324642 | 11/1994 | Japan | G09G 3/36 |

*Primary Examiner*—William L. Sikes
*Assistant Examiner*—Tai V. Duong
*Attorney, Agent, or Firm*—Hayes, Soloway, Hennessey, Grossman & Hage, P.C.

[57] ABSTRACT

A driver circuit to drive a display by inverting the voltage polarity operates with a reduced power consumption. The driver circuit includes a driving voltage selector circuit including positive and negative driving voltage selector circuits alternately arranged therein and a circuit which conducts a change-over operation between a state in which signals respectively from the positive and negative driving voltage selector circuits are respectively outputted to first and second terminals in a first horizontal period and a state in which signals respectively from the positive and negative driving voltage selector circuits are respectively sent to second and first terminals in a second horizontal period.

8 Claims, 12 Drawing Sheets

FIG. 2
PRIOR ART

| VIDEO INPUT DATA $V_i$ | | | | DRIVING OUTPUT VOLTAGE $V_o$ | OUTPUT TRANSISTOR TURNED ON |
|---|---|---|---|---|---|
| $D_{n-1}$ | ---- | $D_1$ | $D_0$ | | |
| 0 | ---- | 0 | 0 | $V_1$ | $Q_{11}$ |
| 0 | ---- | 0 | 1 | $V_2$ | $Q_{21}$ |
| 0 | ---- | 1 | 0 | $V_3$ | $Q_{31}$ |
| 0 | ---- | 1 | 1 | $V_4$ | $Q_{41}$ |
| ¦ | | ¦ | ¦ | ¦ | ¦ |
| 1 | ---- | 1 | 1 | $V_m$ | $Q_{m1}$ |

FIG. 10

| +/− SWITCH SIGNAL V+1 | SWITCHING SECTION 4 | | | OUTPUT FROM SWITCH SECTION 4 | | | | | | | |
|---|---|---|---|---|---|---|---|---|---|---|---|
| | SWon | SWen | SWoen | To1 | To2 | ---- | Tok | Te1 | Te2 | ---- | Tek |
| 1 | ON | ON | OFF | Oo1 | Oo2 | ---- | Ook | Oe1 | Oe2 | ---- | Oek |
| 0 | OFF | OFF | ON | Oe1 | Oe2 | | Oek | Oo2 | Oo3 | | Ook+1 |

FIG. 13

| DISCHARGE INPUT SIGNAL | +/− SWITCH SIGNAL V+/− | SWITCHING SECTION 4 | | | OUTPUT FROM SWITCHING SECTION 4 | | | | | | | | SWITCH 5 |
|---|---|---|---|---|---|---|---|---|---|---|---|---|---|
| | | SWon | SWen | SWoen | To1 | To2 | ---- | Tok | Te1 | Te2 | ---- | Tek | SWsn |
| 0 | 1 | ON | ON | OFF | Oo1 | Oo2 | ---- | Ook | Oe1 | Oe2 | ---- | Oek | OFF |
| | 0 | OFF | OFF | ON | Oe1 | Oe2 | | Oek | Oo2 | Oo3 | | Ook+1 | OFF |
| 1 | X | OFF | OFF | OFF | Te1 & SHORT CIRCUIT | Te2 & SHORT CIRCUIT | ---- | Tek1 & SHORT CIRCUIT | To1 & SHORT CIRCUIT | To2 & SHORT CIRCUIT | ---- | Tek & SHORT CIRCUIT | ON |

DRIVER CIRCUIT FOR DRIVING LIQUID-CRYSTAL DISPLAY

BACKGROUND OF THE INVENTION

The present invention relates to a driver circuit, and in particular, to a driver circuit for driving a liquid-crystal display (LCD).

DESCRIPTION OF THE PRIOR ART

Liquid-crystal displays have been recently employed in various computers such as notebook personal computers and hence the size and performance thereof are been remarkably increasing every year. The display above includes a driver circuit to output a large number of gradations for a highly precise image and to drive the display with an alternating-current drive for a longer life thereof. An example of the driver circuit has been described in the Japanese Patent Laid-Open No. 4-149591. The configuration of the driver will be now described in detail by referring to FIGS. 1 and 4.

In FIG. 4, a driver circuit 34 includes k n-bit shift registers 15 each to obtain video input data 7 in response to a clock pulse Vc, k n-bit latches 16 each to attain the input data in response to a latch pulse Vr, k selector circuits 14 each to produce a selection signal according to the data thus attained, and a switching section 3 to select and set to a conductive state a transistor to which a voltage is being supplied depending on the selection signals respectively from k selector circuits 14. The first n-bit shift register 15 receives n-bit data in parallel in response to the clock pulse Vc. Each of the other (k−1) n-bit shift registers 15 obtains in response to the next clock pulse Vc data outputted from the n-bit shift register 15 preceding thereto. When pixel data Vi is received in the shift registers 15, k clock pulses Vc are counted. In response thereto, a latch pulse Vr is produced. The switching section 3 includes k switching circuits 31 respectively corresponding to the k selector circuits. Each switching circuit 31 includes m transistors to produce a picture in m gradation levels. The circuit 31 is responsive to a selection signal from an associated selector 14 to make conductive a transistor corresponding to the selection signal and then selectively connects m-gradation voltages V1 to Vm, which are to be respectively fed from m-gradation voltage input terminals 8*a* to 8*m*, respectively to output terminals T1 to Tk, thereby providing driving output voltages V1 to Vm. FIG. 3 shows an m-gradation voltage generating circuit to produce the voltages V1 to Vm in m gradation levels. In this circuit, the polarity of each of the voltages V1 to Vm to be fed to the switching section 3 is inverted according to a change-over switch signal SW. By supplying the m-gradation voltages V1 to Vm alternately different in polarity to driver circuits 34 shown respectively in the upper and lower portions in FIG. 4, source lines 36 are driven to be inverted at an interval of one horizontal period. FIG. 2 shows a relationship between the driving output voltages from the switching section 3, transistors set to the conductive state, and video input data. In this connection, FIGS. 6 and 7 show the states of polarity in the LCD in one horizontal period and that in the subsequent horizontal period.

Furthermore, when compared with the LCD of FIG. 4 in which a driver section 34 is arranged on each side of a display section 32, to increase the display area while keeping the overall surface area unchanged, attention has been more drawn to a display of FIG. 5 including a driver section 35 on one side of a display section 32. In this configuration, however, each driver circuit 35 is required to supply adjacent source lines respectively with driving voltages respectively having positive and negative polarities so as to change the polarities of driving voltages to be applied to the adjacent source lines at an interval of one horizontal period. Consequently, like in the driver section 34 shown in FIG. 1, the polarities of m-gradation voltages produced from the m-gradation voltage generator 100 are altered by change-over switches to achieve the polarity inverting operation above.

Since the m gradation voltages from the m-gradation voltage generator are inverted in polarity at an interval of one horizontal period, the wiring capacity of wirings from the voltage generator to the respective transistors of the switching section 3 as well as the junction capacity of each transistor are required to be electrically charged or discharged according to the polarity inversion, resulting in an increased power consumption. In addition, the adjacent pixels of the LCD respectively have the different polarities in any situation and the polarity of each pixel is changed in the next horizontal period. Therefore, the source lines supplied with the voltages to drive the LCD is electrically charged or discharged according to the the polarity inversion in the subsequent horizontal period, which disadvantageously increases the consumed power.

SUMMARY OF THE INVENTION

It is therefore an object of the present invention to provide a driver circuit to drive a liquid-crystal display with a reduced power consumption.

In accordance with the present invention, there is provided a driver circuit including a first driving voltage selector circuit and a second driving voltage selector circuit for respectively producing therefrom driving voltages respectively to a first output terminal and a second output terminal according to data inputted thereto, the driving voltage fed to the first output terminal having a polarity different from that of the driving voltage delivered to the second output terminal. The driver circuit further includes a first driving output terminal and a second driving output terminal disposed respectively in association with the first and second output terminals, and switching means respectively disposed between the first and second output terminals and between the first and second driving output terminals.

By appropriately operating the switching unit between the output terminal and the driving output terminal, each driving voltage selector circuit receives only a positive or negative m-gradation voltage and hence it is not necessary for the m-gradation voltage generator to electrically charge or discharge the wiring capacity and junction capacity, thereby reducing the power consumption.

BRIEF DESCRIPTION OF THE DRAWINGS

The objects and features of the present invention will become more apparent from the consideration of the following detailed description taken in conjunction with the accompanying drawings in which:

FIG. 2 is a table showing a conventional example of output signal selection in the driver circuit;

FIG. 10 is a table for explaining operation of a switching section of the first embodiment in accordance with the present invention;

FIG. 13 is a table for explaining operation of a switching section of the second embodiment.

DESCRIPTION OF THE PREFERRED EMBODIMENTS

Referring now to the accompanying drawings, description will be given of embodiments of the driver circuit in accordance with the present invention.

Figure 1:
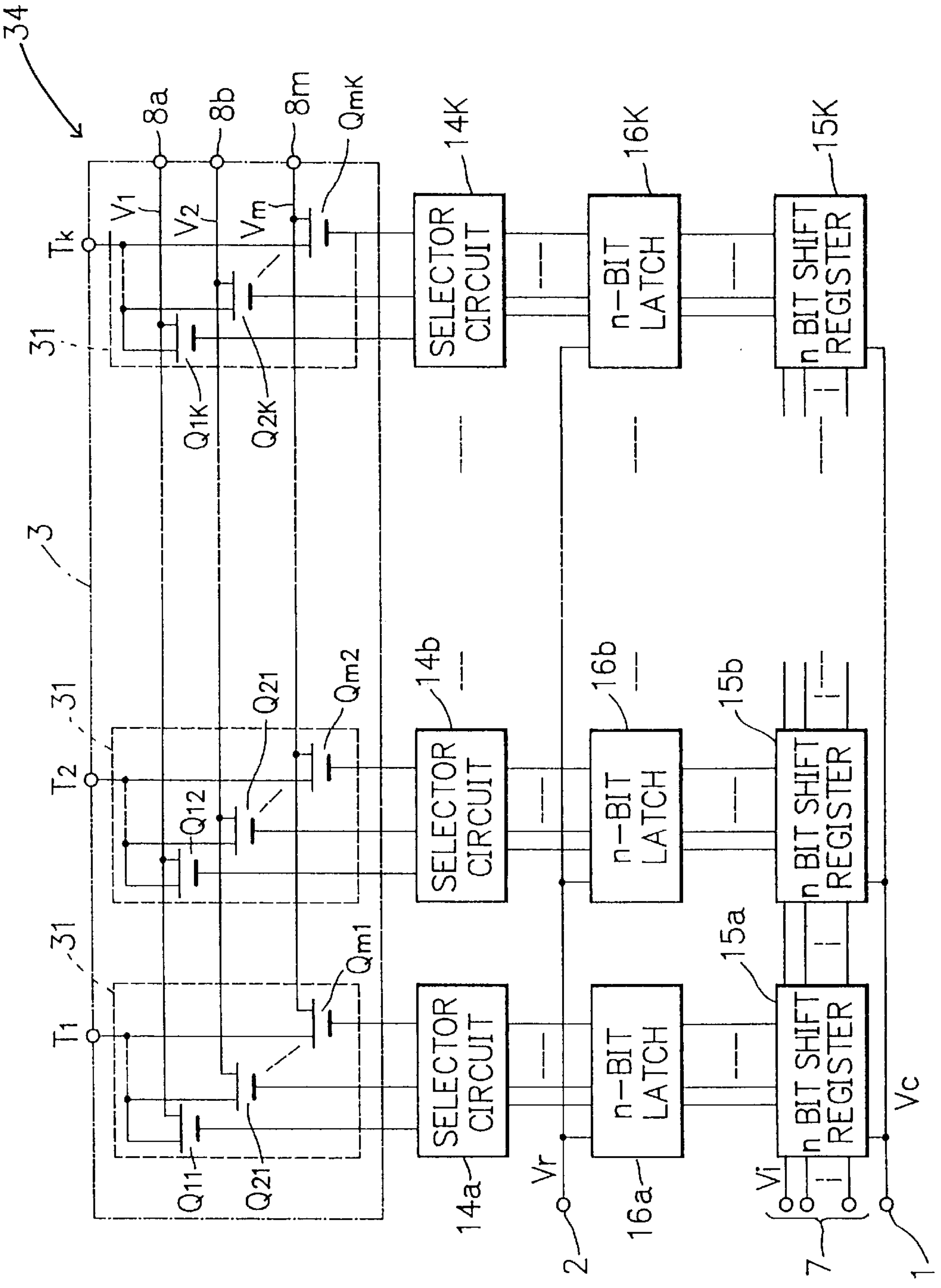
FIG. 1 PRIOR ART
FIG. 1 is a schematic block diagram showing a conventional driver circuit.
Figure 3:
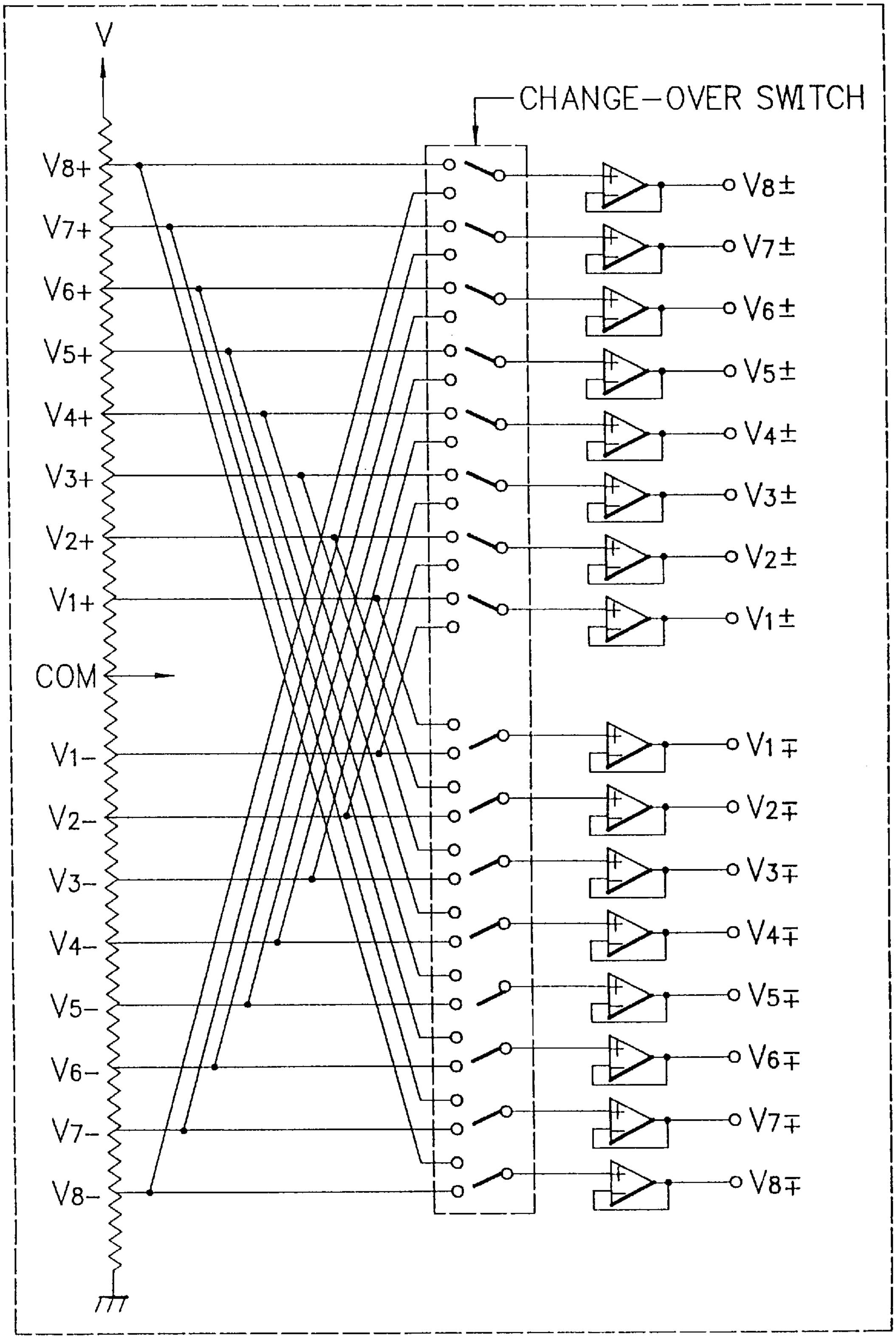
FIG. 3 PRIOR ART
FIG. 3 is a diagram schematically showing an m-gradation voltage generator employed in the conventional driver circuit.
Figure 4:
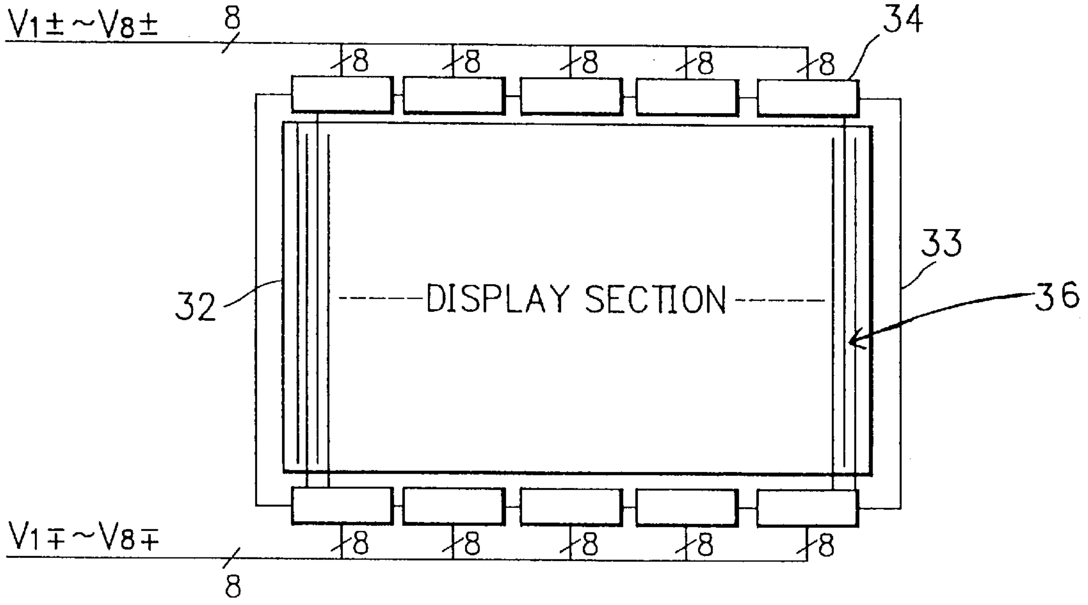
FIG. 4 PRIOR ART
FIG. 4 is a diagram showing the circuit layout including a driver circuit in both sides of a display section.
Figure 5:
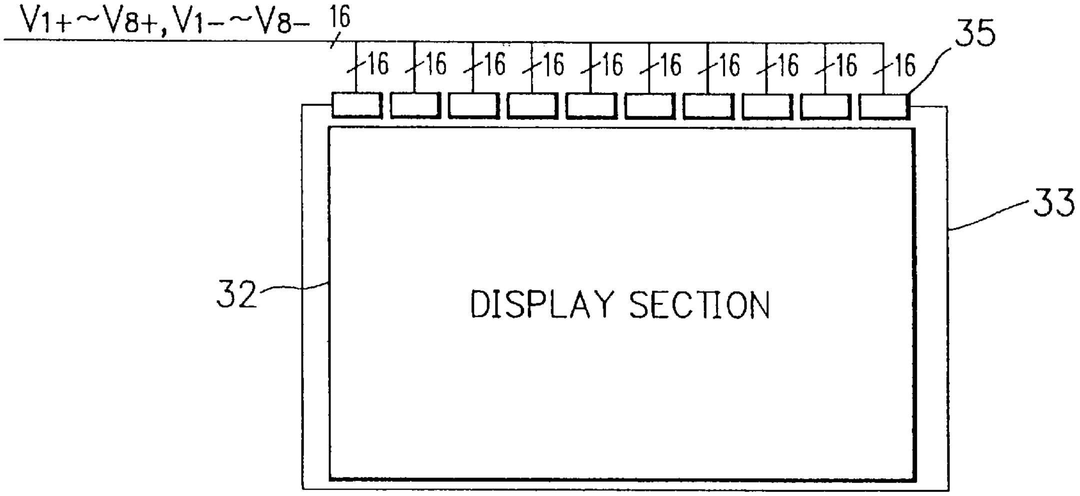
FIG. 5 is a diagram showing the circuit layout including a driver circuit only in one side of the display section.
Figure 6:
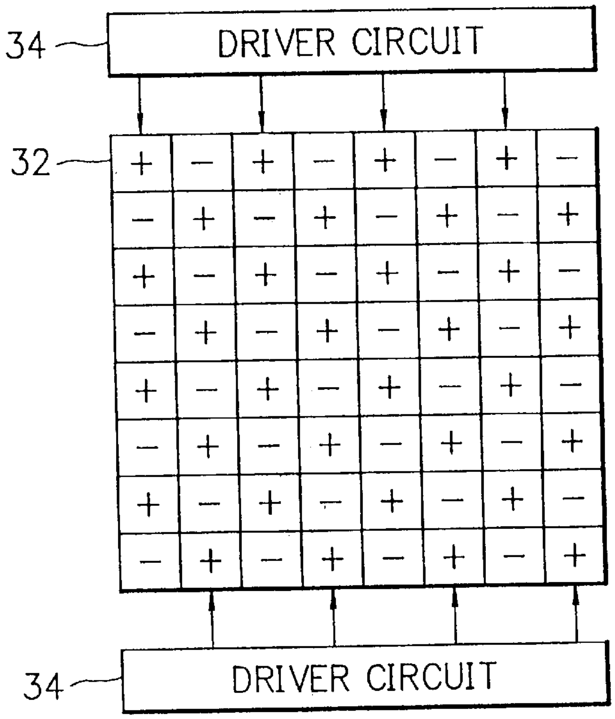
FIG. 6 is a diagram for explaining an example of operation to control the screen according to dot inversion.
Figure 7:
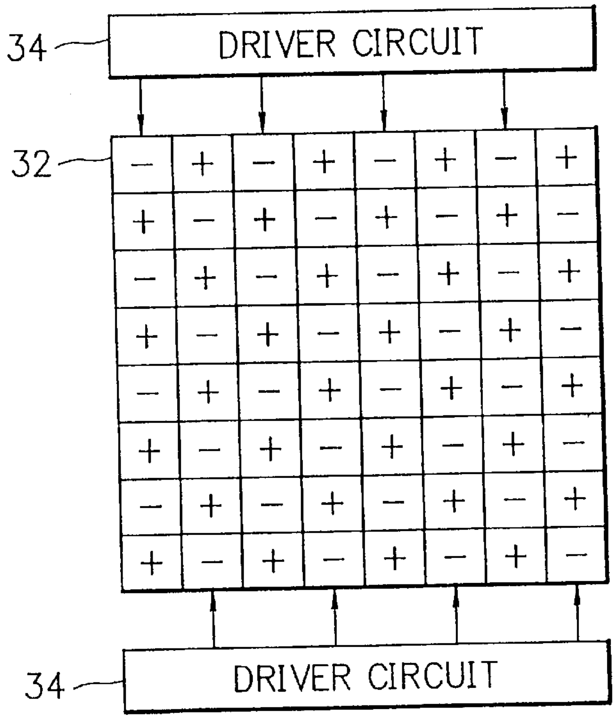
FIG. 7 is a diagram for explaining another example of operation to control the screen according to dot inversion.
Figure 8:
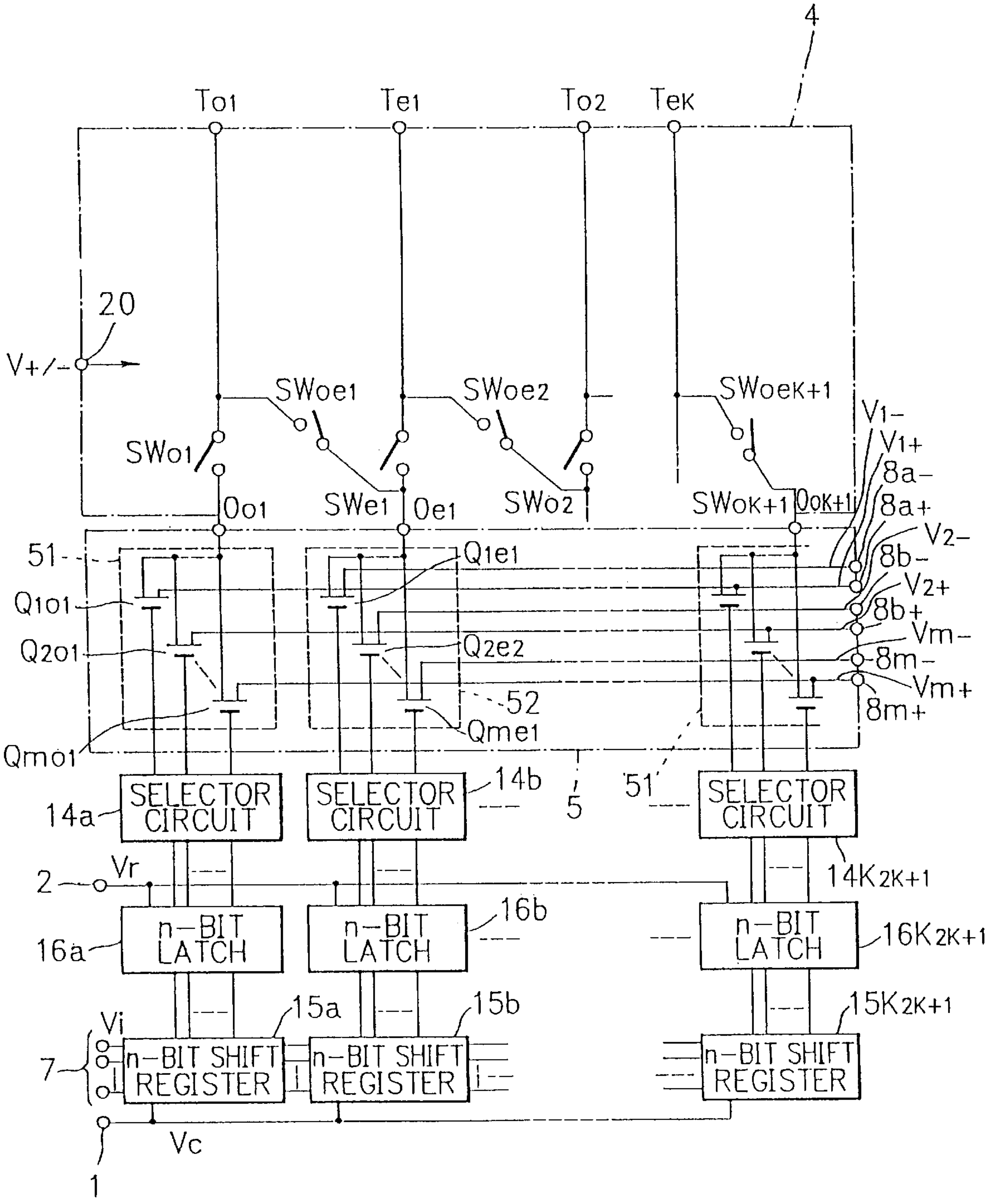
FIG. 8 is a schematic block diagram showing a first embodiment of the driver circuit in accordance with the present invention.

FIG. 8 shows a first embodiment of the driver circuit of the present invention. In this construction, the same constituent elements as those of the conventional LCD shown in FIG. 1 will be assigned with the same reference numerals and it is hence to be understood that description thereof will be unnecessary. Like the configuration of FIG. 5, the driver circuit of FIG. 8 is provided only on one side of a display section in this embodiment.

Figure 14:
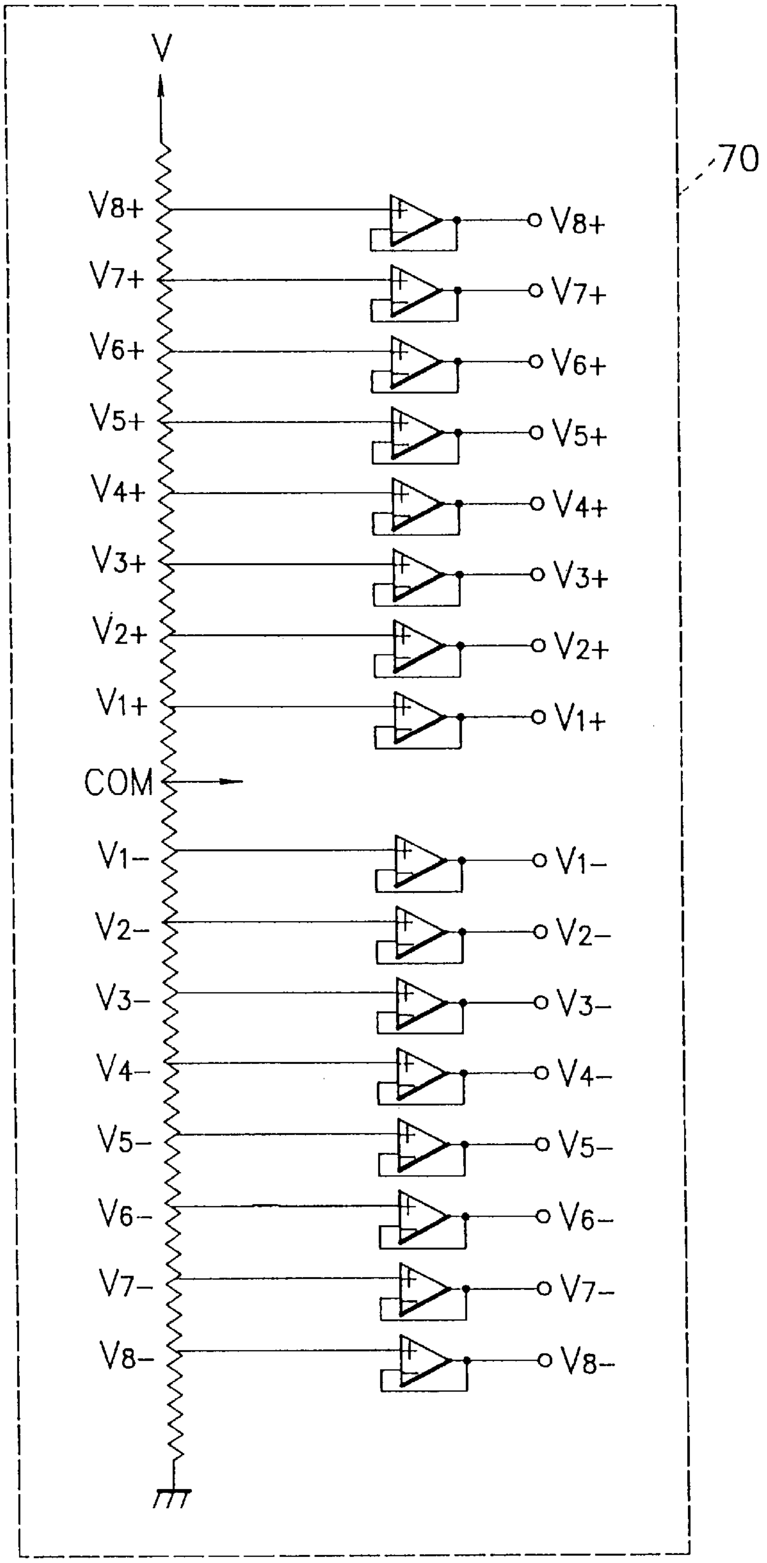
FIG. 14 is a diagram showing an m-gradation voltage generator used in the driver circuit of the present invention.

As can be seen from FIG. 8, to drive source lines in 2 k stages, there are disposed (2k+1) n-bit shift registers 15, (2 k+1) n-bit latches 16, (2 k+1) selector circuits 14, a driving voltage selector circuit 5 including k positive driving voltage selector circuits 51 and (k+1) negative driving voltage selector circuits 52, and a switching section 4. The section 4 includes driving output terminals T and switches $SW_o$ each disposed respectively between an output terminal 0 of the selector circuit 5 and an associated driving output terminal T and switches SWoe each connecting the output terminal 0 to an adjacent driving output terminal T. The switches $SW_o$ and SWoe are complementarily controlled depending on a polarity switch signal V+/− received via a terminal 20. For example, the switch signal V+/− is directly fed to the switch $SW_o$; whereas, before the signal V+/− is delivered to the switch SWoe, the signal V+/− is required to be inverted, e.g., by an inverter. In the driving voltage selector 5, positive driving voltages +V1 to +Vm are supplied to odd-numbered stages and negative driving voltages −V1 to −Vm are fed to even-numbered stages. FIG. 14 shows an m-gradation voltage generator to supply positive and negative m-gradation voltages to the selector 5.

Figure 9:
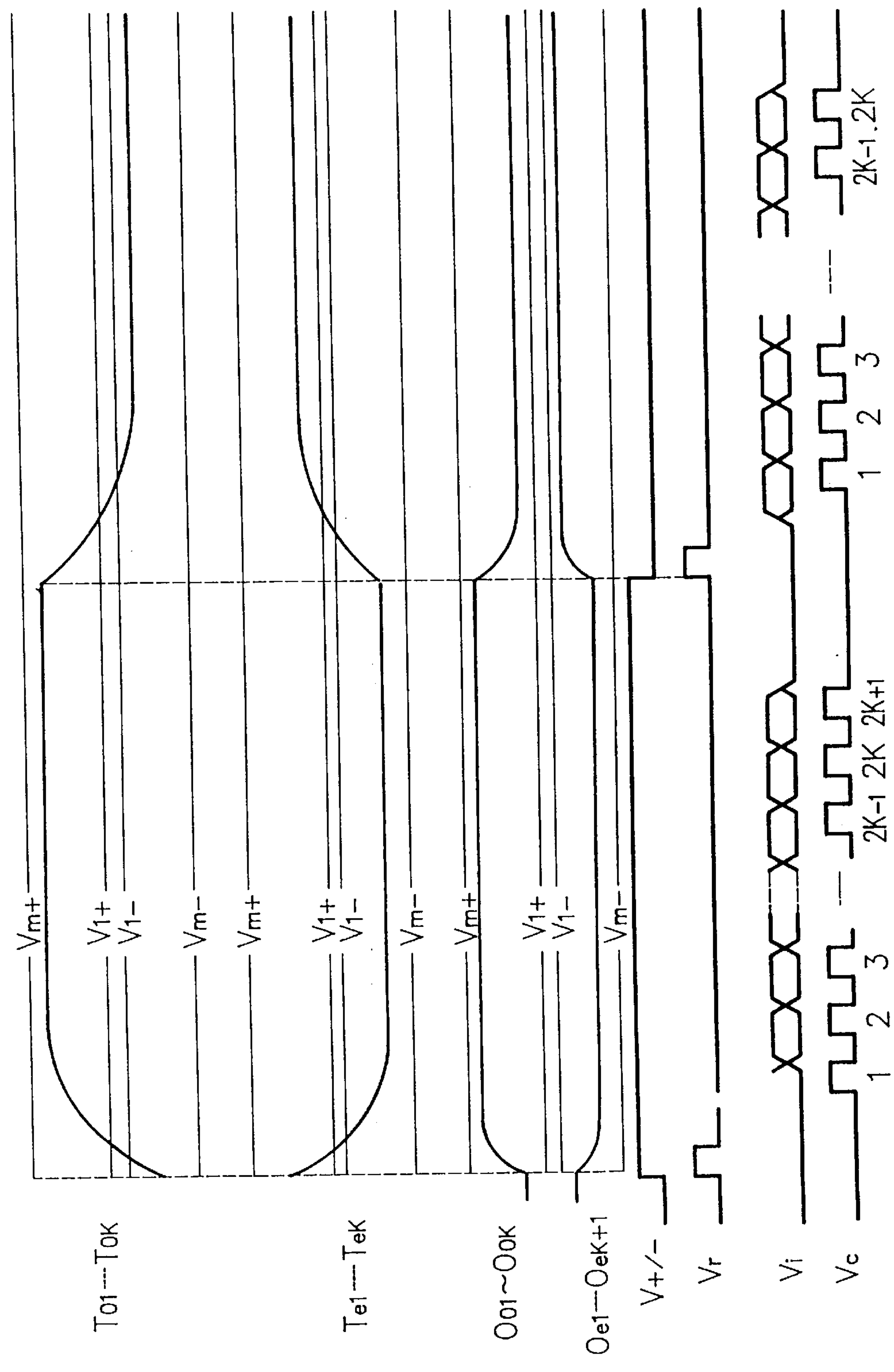
FIG. 9 is a signal timing chart showing operation of the first embodiment.

Operation of the driver of the embodiment will be described in detail by referring to FIGS. 9 and 10. Assume that the odd-numbered source lines respectively linked with the odd-numbered driving output terminals To and the even-numbered source lines respectively coupled with the even-numbered driving output terminals Te are driven respectively by positive and negative driving voltages from the driving circuit 34. First, when 2 k clock pulses Vc are counted, a latch pulse Vr is generated such that pixel data Vi attained in the first to 2 k-th n-bit shift registers is fed to the n-bit latches 16 respectively corresponding thereto. According to the pixel data Vi stored in the n-bit latches, each odd-numbered selector 51 delivers a positive voltage to the output terminal 0*o* and each even-numbered selector 52 outputs a negative voltage to the output terminal 0*e*. When the polarity switch signal V+/− is thereafter set to “1”, all switches $SW_o$ and SWoe are rendered conductive and nonconductive, respectively. As a result, the driving signals produced according to the pixel data Vi are respectively supplied to the driving output terminals To and Te such that positive and negative driving voltages are applied to the odd-numbered and even-numbered source lines, respectively. In short, the signals from the odd-numbered selectors 51 are fed to the odd-numbered driving output terminals To and those from even-numbered selectors 52 are fed to the even-numbered driving output terminals Te.

Description will be given of an operation in which the odd-numbered and even-numbered source lines are respectively driven by the negative and positive driving voltages in the second horizontal period. When the pulses are counted up to the (2 k+1)-st clock pulse Vc, a latch pulse Vr is generated such that pixel data Vi stored in the second to (2 k+1)-st n-bit shift registers is delivered to the n-bit latches 16 respectively associated therewith. Depending on the pixel data Vi thus arranged in the n-bit latches 16, each odd-numbered selector 51 delivers a positive voltage to the output terminal 0*o* and each even-numbered selector 52 sends a negative voltage to the output terminal 0e. Thereafter, when the polarity switch signal V+/− is set to “0”, the switches $SW_{oe}$ and $SW_o$ are made to be conductive and nonconductive, respectively. Therefore, the driving signals created according to the pixel data Vi are fed to the driving output terminals T such that negative and positive driving voltages are applied to the odd-numbered and even-numbered source lines, respectively. That is, the signals outputted from the odd-numbered selectors 51 are fed to the even-numbered driving output terminals Te and those from even-numbered selectors 52 are transmitted to the odd-numbered driving output terminals To. In this embodiment, to minimize the difference in the delay time between the driving voltages fed to the terminals Te and those delivered to the other driving output terminals, there are employed the (2 k+1)-th n-bit shift register 15, (2 k+1)-th n-bit latch 16, (2k+1)-th selector circuit, and (2 k+1)-th driving voltage selector circuit 5 so that the signal from the (2 k+1)-th driving voltage selector circuit 5 is supplied via the switch SWoe to the driving output terminals Te. In this situation, when the delay time is negligibly small or need not be taken into consideration, the output 0*o*1 from the first selector 51 may be linked via the switch SWoe to the driving output terminal Tek to advantageously minimize the size of the circuit configuration. In this case, however, there is required means for changing the sequence of data to be inputted to n-bit shift registers 15. Namely, the means functions such that data items sequentially received in an order of 1, 2, . . . , 2 k directly supplied to the n-bit shift registers 15 in the first horizontal period are fed to the n-bit shift registers 15 in a sequence of 2 k, 1, 2, . . . , 2k−1 in the second horizontal period.

Since the driving voltage is altered in polarity at an interval of one horizontal period, the voltages fed to the driving voltage selector 5 need not be changed. This means that the capacity between the selector circuits 5 and the m-gradation voltage generator need not be charged or discharged for each polarity inversion, which hence leads to reduction in the power consumption and increase in the operation speed.

Figure 11:
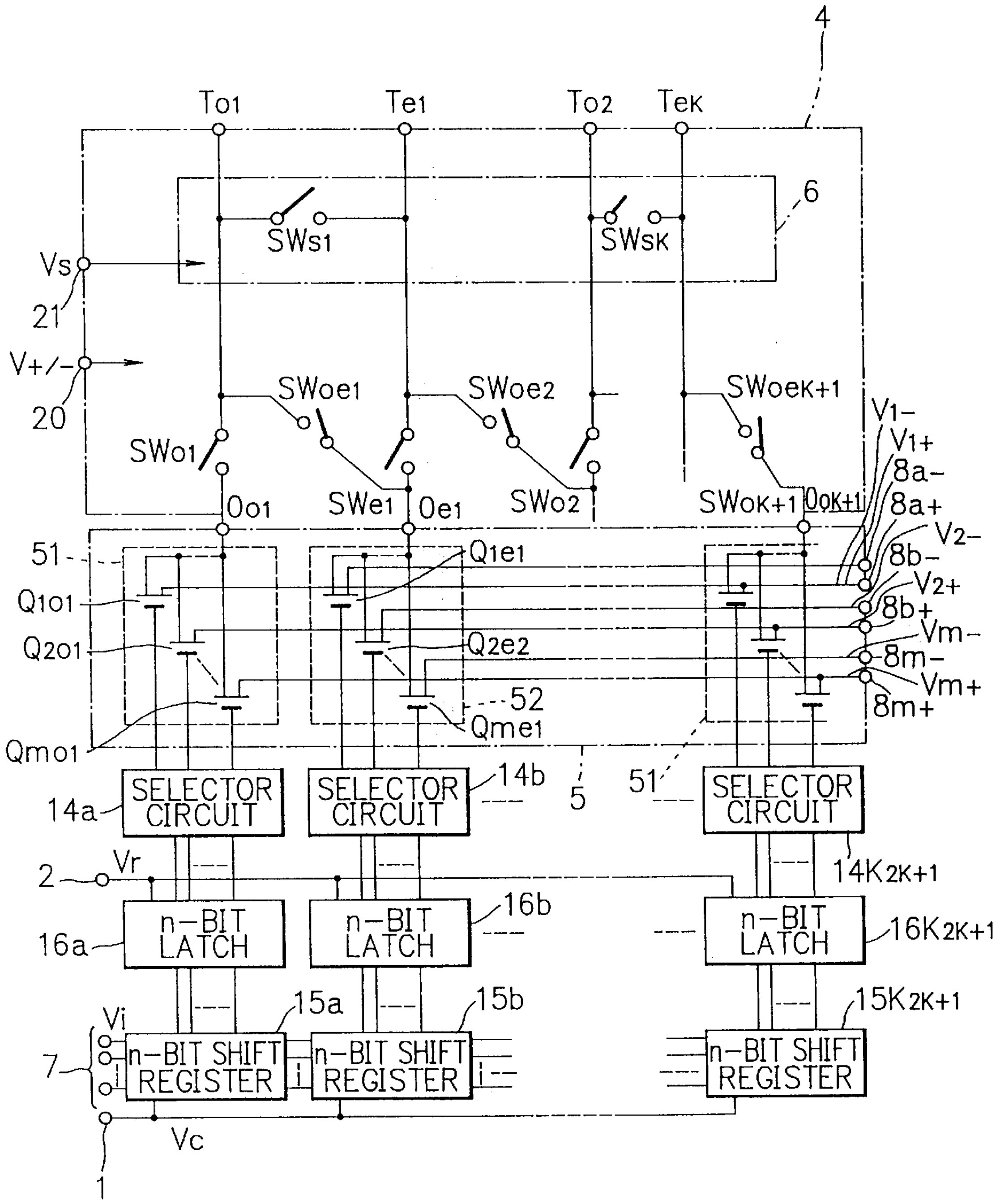
FIG. 11 is a block diagram showing a second embodiment of the driver circuit in accordance with the present invention.

Referring next to FIG. 11, description will be given of the second embodiment of the driver circuit in accordance with the present invention. The constitution of the second embodiment is almost the same as that of the first embodiment excepting the switching section 4. Therefore, description will be given only of the section 4.

The switching section 4 of the second embodiment includes a balanced circuit 6, switches SWoe each to connect the output terminal 0*o* to an adjacent driving output terminal T, and switches $SW_o$ each to connect an odd-numbered driving output terminal to an even-numbered driving output terminal. The balanced circuit 6 includes a plurality of switches $SW_s$ each arranged between an output terminal 0 of the driving voltage selector 5 and a driving output terminal T associated therewith.

Figure 12:
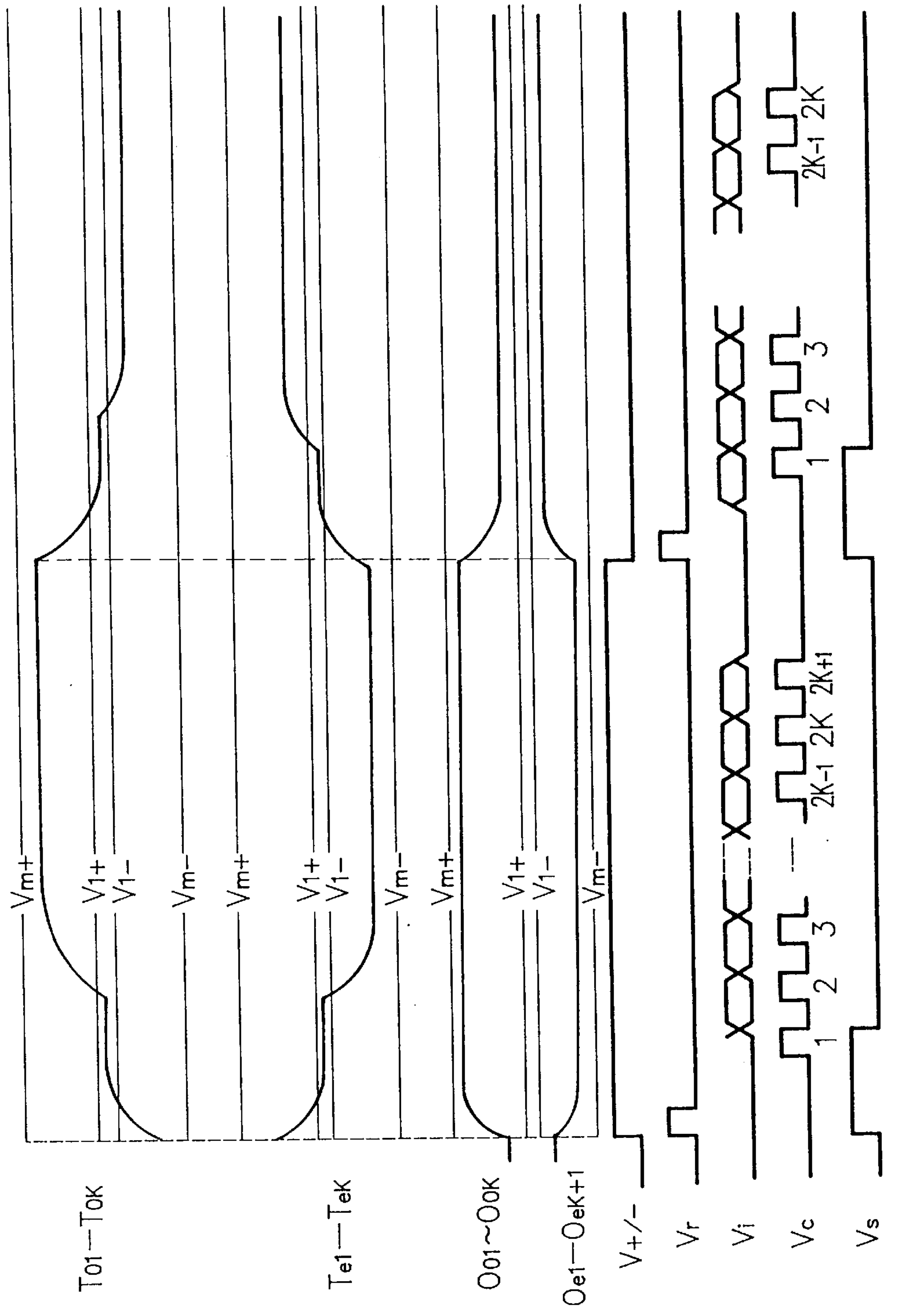
FIG. 12 is a timing chart of signals of the second embodiment.

Operation of the switching section 4 will be described by referring to FIGS. 12 and 13. The switch $SW_s$ is responsive to a signal Vs invoked by a latch signal Vr to equalize the electric charge on the source lines connected to odd-numbered driving output terminals with that on the source lines connected to even-numbered driving output terminals such that the source lines are biased substantially to an intermediate voltage between the negative and positive voltages. However, the switches $SW_o$ and SWeo are controlled as follows. In a state in which the signal Vs rises, the switches $SW_o$ and SWeo are rendered nonconductive. After the signal Vs falls, either one of the switches SW and SWeo is set to a conductive state so as to supply the driving output terminal T with a driving voltage associated with the pixel data.

As above, before the driving voltage is delivered to the driving output terminal T, the source lines respectively connected to the pertinent driving output terminals are biased to an intermediate voltage between the negative and positive voltages. Consequently, it is only necessary to electrically charge or discharge each driving output terminal from the intermediate voltage to the positive or negative voltage. This reduces the range in which the voltage is changed and hence the power consumption is advantageously minimized.

In the description of the first and second embodiments above, the output stage of the driver circuit includes switches to selectively supply driving signals via odd-numbered and even-numbered stages of the output stage. However, to obtain the same advantageous effect, there may be respectively arranged a similar switching circuit between the n-bit latch and the selector circuit, between the selector circuit and the driving voltage selecting circuit, and between the n-bit registers and latches.

Moreover, in the description of the embodiments, there is employed a switch in the driver circuit to effect a polarity inversion such that the voltages fed to the adjacent source lines have mutually different polarities. However, the present invention is applicable to such driving methods as an active matrix driving method in which each pixel is individually controlled and a method in which the polarity is inverted at an interval of several lines.

In accordance with the present invention described above, the driving voltage selector circuit includes a section to produce a positive driving voltage and a section to generate a negative driving voltage. The outputs from the voltage selector circuit are alternately connected to odd-numbered and even-numbered source lines at an interval of one horizontal period. With this provision, the source lines can be driven without inverting at an interval of one horizontal period the polarity of each voltage from the m-gradation voltage generator disposed to produce m-gradation voltages. This results in reduction of the power consumption. Furthermore, the source lines can be set to an intermediate voltage between the positive and negative voltage by establishing a connection between the adjacent source lines and hence it is possible to minimize the change in the voltage thereof when a positive or negative voltage is applied thereto, which further contributes to the reduction of the power consumption.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A driver circuit comprising:

a first driving voltage selector circuit and a second driving voltage selector circuit for respectively producing therefrom driving voltages respectively to first output terminals and second output terminals according to data inputted thereto, the driving voltage fed to the first output terminals having a polarity different from that of the driving voltage delivered to the second output terminals;

a first switching circuit selectively connecting said first output terminals to first driving output terminals, a second switching circuit selectively connecting said second output terminals to second driving output terminals; and a third switching circuit selectively connecting said first output terminals to said second driving output terminals, and selectively connecting said second output terminals to said first driving output terminals.

2. A driver circuit in accordance with claim 1, wherein:

each said switching circuit being controlled by a control signal, one said control signal is at a first level said first switching circuit connecting said first output terminals to said driving output terminals and said second switching circuit connecting said second output terminals to said second driving output terminals, and one said control signal is at a second level said third switching circuit connecting said first output terminals to said second driving output terminals, and connecting said second output terminals to said first driving output terminals.

3. A driver circuit in accordance with claim 1, wherein:

the first driving voltage selector circuit generates a driving voltage having a first polarity in any situation; and the second driving voltage selector circuit generates a driving voltage having a second polarity different from the first polarity in any situation.

4. A driver circuit as claimed in claim 1, wherein each said driving voltage selector circuits further comprising a plurality of transistors to produce a picture in a plurality of gradation levels.

5. A driver circuit as claimed in claim 4, wherein the output lines from said plurality of transistors in each driving voltage selector circuit being connected to said first and second output terminals, respectively, and the output lines of said plurality of transistors outputting a plurality of voltage levels.

6. A driver circuit as claimed in claim 4, further comprising a selector circuit for each respective driving voltage selector circuit, said selector circuit enabling the control lines of said plurality of transistors.

7. A driver circuit as claimed in claim 6, further comprising a plurality of n-bit shift shift registers, said shift registers obtaining video input data in response to a clock pulse; and a plurality of n-bit latch to hold said video input data in response to a latch pulse, said selector circuits producing a selection signal to said control lines of said plurality of transistors in response to said video input data in said n-bit latch.

8. A driver circuit as claimed in claim 1, further comprising a fourth switching circuit selectively connecting said first driving output terminals to second driving output terminals, said fourth switching circuit being to equalize the electric charge of said first and second driving output terminals.

* * * * *